United States Patent [19]
Müller et al.

[11] Patent Number: 5,296,151
[45] Date of Patent: Mar. 22, 1994

[54] PROCESS FOR THE PRECIPITATION OF PHOSPHATE WITH IRON HYDROXIDE

[75] Inventors: German Müller, Bammental; Siegfried Riethmayer, Freiburg, both of Fed. Rep. of Germany

[73] Assignee: Industrie Automation Sondertechnik GmbH & Co., Heidelberg, Fed. Rep. of Germany

[21] Appl. No.: 939,468

[22] Filed: Sep. 2, 1992

[30] Foreign Application Priority Data

Sep. 4, 1991 [EP] European Pat. Off. ........ 91114928.4

[51] Int. Cl.$^5$ .............................. C02F 1/58; C02F 1/72
[52] U.S. Cl. ...................................... 210/716; 210/722; 210/906; 210/907; 423/305; 423/311; 423/140
[58] Field of Search ............... 210/716, 721, 722, 758, 210/906, 907; 423/305, 311, 140, 158, 167

[56] References Cited

U.S. PATENT DOCUMENTS

| | | | |
|---|---|---|---|
| 3,499,837 | 3/1970 | Jaunarajs | 210/906 |
| 4,267,058 | 5/1981 | Kyri et al. | 210/716 |
| 5,009,793 | 4/1991 | Muller | 210/710 |

FOREIGN PATENT DOCUMENTS

| | | |
|---|---|---|
| 0009718 | 4/1980 | European Pat. Off. |
| 3001929 | 7/1981 | Fed. Rep. of Germany |
| 3200164 | 12/1982 | Fed. Rep. of Germany |

OTHER PUBLICATIONS

Kawashima et al., Water Research Bd. 20, Nr. 4 471–475 (1986).
Appleton et al., Environmental Science and Technology Bd. 15 Nr. 11 1383-1386 (1981).

*Primary Examiner*—Stanley S. Silverman
*Assistant Examiner*—Neil M. McCarthy
*Attorney, Agent, or Firm*—Birch, Stewart, Kolasch & Birch

[57] ABSTRACT

A process is provided for the precipitation of phosphates from phosphate-comprising waters which utilizes iron hydroxide of the formula $Fe_2O_3 \cdot nH_2O$ wherein $n=0.5$–$3.0$. The iron hydroxide is prepared from natural or technical muds comprising iron in a process which involves dissolving with mineral acid and precipitation with a base. Other metal hydroxides are used together with the iron hydroxide.

18 Claims, No Drawings

PROCESS FOR THE PRECIPITATION OF PHOSPHATE WITH IRON HYDROXIDE

BRIEF DESCRIPTION OF THE INVENTION

The present invention relates to a process for the precipitation of phosphate from phosphate-containing waters.

BACKGROUND OF THE INVENTION

Fertilizers, human and animal discharge, household garbage and detergents and cleansing agents give rise to dissolved phosphate in surface waters.

Increased growth of plants, especially algae, is a result thereof. As little as 1 g of phosphorus leads to the formation of 100 g of biomass, the mineralization of which ultimately also uses 150 g of oxygen. This results in lack of oxygen so that fish will suffocate and an anaerobic rottening processes will develop; i.e., the water source "tilts over".

5-10 mg of phosphorus/liter are present in municipal sewage, the major part being o-phosphate in the form of an easily soluble sodium salt. As far as the phosphates are derived from detergents and cleansing agents, polyphosphates (e.g. sodium tri-polyphosphate) are also present. They will, however, be hydrolyzed to o-phosphates, although this will already take place in the sewage pipe.

According to the Sewage Treatment Regulation (Rahmen-Abwasser-Verarbeitungsvorschrift) from Sep. 8, 1989 (the Secretary for Environment, Protection of Wildlife and Reactor Safety) (Bundesminister for Umwelt, Naturschutz und Reaktorsicherheit) sewage from plants with more than 100,000 person units may have a maximum content of 1 mg phosphorus/liter in the effluent.

The desired value is, however, below 0.5 mg phosphorus/liter.

It is known to remove the dissolved phosphates by precipitation with dissolved metal salts.

For the removal of dissolved phosphates all metal cations which form water-insoluble or only slightly soluble phosphates can be used. Specific and preferred examples of cations are iron, aluminum and alkaline earth metals. In simplified form, the precipitation processes proceed as follows:

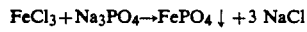

FeCl₃+Na₃PO₄→FePO₄↓ +3 NaCl

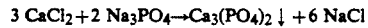

3 CaCl₂+2 Na₃PO₄→Ca₃(PO₄)₂↓ +6 NaCl

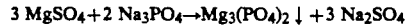

3 MgSO₄+2 Na₃PO₄→Mg₃(PO₄)₂↓ +3 Na₂SO₄

2 Na[Al(OH)₄]+2 Na₃PO₄→2 AlPO₄↓ +8 NaOH

The pH in municipal clarification plants ranges between 7.5 and 8.2. The pH of the precipitating agent used is almost without significance because the added amounts are far too small to be able to perceptibly change pH in the total mass. For the precipitation of phosphate it is, therefore, equally possible to use strongly alkaline products (e.g. aluminates) and strongly acidic products (e.g., mixed halogenides of $Al^{3+}$, $Fe^{3+}$, $Ca^{2+}$ and $Mg^{2+}$ from the montmorrilonite chemistry, with pH<1).

The selection of preferred products to be actually used depends on a number of criteria such as availability, price, the supplier's application technology service and the qualitative balancing of one precipitating agent against another.

One of the qualitative criteria is the productivity, i.e. the amount theoretically necessary to obtain as quantitative a precipitation as possible. That depends on the stoichiometric ratio between the molecular weight of phosphorus and of the metal in the precipitating agent.

For the precipitation of 1 mol of phosphorus (31 g) the theoretically necessary amounts are:

27 g Aluminum
36.5 g Magnesium
56 g Iron or
60 g Calcium.

Another qualitative criteria is the solubility in water of the precipitated phosphate. The smaller the solubility in water, the smaller the amount of necessary precipitating agent, and the smaller will also be the remaining dissolved phosphate. Among the o-phosphates aluminum phosphate (AlPO₄) has the lowest solubility in water, closely followed by iron phosphate. Among the cations mentioned above, magnesium forms the most water-soluble phosphate.

In general, the solubility of the phosphates in water increases with increasing pH.

The above-mentioned considerations form only a part of the complex quality criteria. In reality, nowadays the most often used agents are iron chloride, iron sulfate and iron chloride sulfate in the form of aqueous solutions, not only because of cost reasons and the general availability (Titanium Chemistry) but also because iron in contrast to aluminum and the alkaline earths bind hydrogen sulfide as insoluble iron sulfide and ensures sulfur-free fermentation gas. The disadvantage connected to the use of iron salts for the precipitation of phosphate is the secondary loading of the waters by soluble halogenides and sulfates.

It is true that the aluminates nowadays have a considerable share of the market, but they also have the disadvantage connected to their inability to bind the hydrogen sulfate.

Furthermore, it is known from the literature (Alan, Appleton et al, Environmental Science and Technology, Vol. 15, No. 11, p. 1383-1386, Nov. 1981 or Kawashina et al., Water Research, Vol. 20, No. 4, p. 471-475, April 1986), that iron hydroxides are usable in the precipitation of phosphate.

It has, however, not yet been proved in practical verification in large scale because the aging processes inactivates the surface of iron hydroxide and constantly diminishes the precipitation capacity of iron hydroxide. It is also not possible to work with freshly precipitated iron oxide in practice. It is necessary to ensure storage stability. Storing takes place both at the production site, in the transportation and at the consumption site. It is also not possible to completely empty the storage tanks at the production site or at the consumption site. Some parts of the product will remain and they will proceed in the aging process. The aging stability is the determining criteria for the use of iron hydroxide in the precipitation of phosphate. The patent literature offers suggestions with iron hydroxides only from certain sources and blends (DE-A-30 01 929; DE-A 32 00 164; Ep-A-0 009 718).

DETAILED DESCRIPTION OF THE INVENTION

One object of the present invention is, therefore, to overcome these disadvantages and to obtain the desired amount of the residual content of <0.5 mg phosphorus/liter after the precipitation.

This object is obtained according to the invention by using iron hydroxide with the formula $Fe_2O_3 \cdot nH_2O$ as precipitating agent, in which $n=0.5-3.0$, which is obtained using the processes described in European Patent Specification No. 0 072 885 B1 (issued on Apr. 30, 1986) and European Patent Application No. 0 377 766 A1 (made available to the public on Jul. 18, 1990), according to which the iron hydroxide is prepared by dissolving metals from an iron-comprising starting material by means of mineral acids, preferably hydrochloric acid, at pH 0.5–2.5, isolating the solids from the dissolved metal salts, optionally treating the dissolved metal salts with an oxidizing agent and re-precipitating the iron in the form of hydroxide at pH 3.5–4.5, preferably 4.0.

It has, surprisingly, been found that iron hydroxide is non-aging and can be used as a precipitating agent for phosphates when it has been prepared according to the processes as described in European Patent Specification Nos. 0 072 885 and 0 377 766.

In the present specification the term "metals" covers not only light and heavy metals but also metalloids.

The oxidation can be performed by any oxidizing agent. Preferred oxidizing agents are air and hydrogen peroxide. The oxidation is preferably performed by passing air for 5 to 20 minutes or by the addition of 0.01% of hydrogen peroxide.

The re-precipitation of iron is performed by alkalis, preferably by means of a sodium hydroxide solution or milk of lime.

Iron hydroxide is not stable in divalent form, and nor does the trivalent iron hydroxide correspond to the formulae $Fe(OH)_3$. It exists in different steps as iron oxide-hydrate of the formula $Fe_2O_3 \cdot nH_2O$ in which $n=0.5$ to 3 ($n=1$ corresponds to $FeO(OH)$; $n=3$ corresponds to $Fe(OH)_3$). The most often occurring form is the form in which $n=1$, that means $FeO(OH)$, which can crystallize in three different forms.

For the sake of convenience iron oxide-hydrate will, in the present specification, be designated as "iron hydroxide".

Another, practically free raw material source for iron hydroxide is heavy metal contaminated mud dug up from rivers and harbors, sewage sludge, soil, fly dust, filter dust or residues from combustions and pyrolysis or scrap. The major part of heavy metals in products like that is still always iron. The availability is universal.

In one aspect of the invention the iron hydroxide used for the precipitation can also comprise other metal hydroxides. Other hydroxides are preferably calcium, magnesium, aluminum and/or silicon hydroxide in which the proportion of iron makes up more than 50% of the total metal content.

These other metals have an advantageous influence on the age-stability of the iron hydroxides relevant for the precipitation, and especially silicon hydroxide of the formula $SiO_2 \cdot n'H_2O$ can be very advantageous for the aging-stability ($n'=1-330$).

The above-mentioned hydroxide mixture can for example be prepared by the above-described precipitation of iron salt comprising solutions at pH 3.5–4.5 by means of bases. As the (toxic) heavy metals will remain dissolved at these pHs, about ⅔ of the dissolved aluminum salts, if any, about half of the silicon present, about 15% of the dissolved calcium salts and about 5% of the dissolved magnesium salts will be precipitated together with the iron as hydroxides. These metals are themselves also precipitating agents for phosphates which means that their presence does not have any harmful influence on the precipitation, but assists therein.

Phosphorus will be almost quantitatively eliminated by such iron hydroxides and only minimal residual amounts of $<0.5$ mgP/liter will remain.

The interfering co-precipitation of iron metals can be controlled by oxidizing the metal salt comprising solutions and controlling the pH. If, for instance, air is passed through the metal salt solution before the precipitation for 10 minutes in order to bring about oxidation, the precipitation of the major amount of optionally present lead or chromium will only take place at pH 5.

Furthermore, it has been shown that the aging resistance of the iron hydroxide according to the invention, especially of the iron hydroxide essentially freed from other metal hydroxides, can be improved considerably by means of protecting colloids. The crystallization is prevented or at least delayed considerably.

The amounts to be added depend on the specific characteristics of the protecting colloids and is relative to the total volume of the hydroxide slurry (most often 0.5–2.0%) or of the total content of iron and other hydroxides present in the hydroxide slurry (most often 10–35%).

If the protecting colloids are not active any longer in the acidic range, the iron and the other hydroxides can be washed until neutral.

As protecting colloids practically all substances known for these properties can be used, such as cellulose ether (e.g. methylcellulose, ethylcellulose); for technical reasons cellulose ethers with a medium degree of polymerization of less than 1000 are preferred;

carboxymethylcellulose;

proteins, for instance gelatin; lysalbinic acids and salts and esters thereof;

pectins;

starch;

carob seed grain ether;

polysaccharides (i.e., Xanthan rubber);

gum arabic;

natural or synthetic latex types;

tragaganth;

polyacrylate, polyacrylamide; polyvinyl pyrrolidon, PVA;

alkali soaps, ammonium and amine soaps;

alginates;

bentonite.

The advantages of the processes according to the invention compared with the usual precipitations using iron or aluminum salt solutions are as follows:

It is possible to use solid iron hydroxide in the form of an aqueous suspension for the precipitation in contrast to the until now used iron salt solutions.

There will be no secondary challenge of the water caused by chloride or sulfate.

Complete precipitation of the phosphate caused by the double salt formation and absorption. Double salts of the type $Fe(OH)_3 \cdot FePO_4$ are less water soluble than $FePO_4$ alone. The double salts of iron are superior to analogous compounds of aluminum because iron hydroxide is considerably less soluble in water than aluminum hydroxide.

The adsorption of phosphate on the surface of iron hydroxide can also have considerable influence on the rapidity and the completeness of the precipitation. Iron hydroxide has a surface area of 600 m$^2$/g with greater adsorption power. In comparison to aluminum hydroxide with a surface area of only 125 m²/g, iron hydroxide is also considerably superior.

The absorption capacity, and in this manner also the precipitating capacity of iron hydroxide, is improved by the presence of silicon which is precipitated in the form of polymeric silicic acid and hydratized silicon dioxide. These compounds have an extraordinarily high adsorption ability.

The adsorption ability of iron hydroxides provide for a lowering of the CSB (chemical oxygen demand) value of 10-30%.

Iron hydroxide has no influence on the biological nitrification which proceeds optimally at a pH of 7.5-8.0. Iron halides on the other hand have acidic reaction and can have a detrimental influence on the nitrification—at least locally.

The iron hydroxides according to the invention maintain their full activity also in alkaline pH ranges.

Similar to iron salt solutions iron hydroxide suspensions will also bind hydrogen sulfide as insoluble iron sulfide. The fermentation gas will be free from hydrogen sulfide.

Similar to iron salt solutions, iron hydroxide suspensions can also be used as conditioning agents for sewage sludge in a filter press. Used together with hydrolyzed lime it will improve the draining.

The invention can be more fully understood by reference to the following non-limiting examples.

EXAMPLES

Example 1

Chemically pure iron nitrate solution is adjusted to pH 4.0 by means of hydraulic lime Ca(OH)$_2$. Iron is precipitated in an amount of more than 99.5% as iron hydroxide.

The content of iron was adjusted to 6.0 mg Fe/ml.

A solution of trisodiumphosphate was added and the content of phosphorus was adjusted to 10.0 mg phosphorus/liter.

To 100 ml of this phosphate solution with pH 7.5 3 ml of the iron hydroxide suspension were added at 23° C., stirred for 15 minutes and membrane filtrated (pore size 0.2 μm).

The precipitation as described above of the phosphate took place, calculated after the preparation of the iron hydroxide suspension, after 24 hours and after aging of the suspension during 45 days and during 60 days. The photometrically measured residual content of phosphorus in the filtrate corresponded to 0.11, 0.36 and 1.85 mgP/liter.

Example 2

Mud from the middle of the river Neckar was treated at room temperature at pH 0.5 with hydrochloric acid during stirring and air injection for 1 hour. Thereafter the mud was filtered off and rinsed with distilled water.

The filtrated hydrochloric acid extract was adjusted to pH 4.0 by means of sodium hydroxide solution and was stirred by room temperature for 15 minutes. The precipitated iron hydroxide precipitate consisted of:
  Fe: 1.86 mg/Liter
  Al: 0.62 mg/Liter
  Ca: 0.24 mg/Liter
  Si: 0.18 mg/Liter
  Mg: 0.06 mg/Liter Samples of each 4 ml of this slurry were thereafter added to the ortho phosphate solution as described in Example 1 and subjected to further treatment.

The addition was performed after 1 day and after an aging of the suspension for 45 days and for 60 days.

The residual phosphorus content in the filtrate was corresponding to 0.25, 0.40 and 0.38 mgP/liter.

EXAMPLE 3

The procedure as described in Example 2 was repeated and 0.55 g of methylcellulose was stirred into 100 ml of the slurry. Samples of each 4 ml of this slurry were thereafter stirred into the ortho phosphate solution as in Example 1 after 1 day, after 45 days and after 60 days.

The residual phosphorus content was corresponding to 0.23, 0.26 and 0.29 mgP/liter.

We claim:

1. A process for the precipitation of phosphates from municipal and industrial waters and other phosphate comprising waters which comprises adding to the water a precipitating agent comprises of iron hydroxide of the formula $$Fe_2O_3 \cdot nH_2O$$

wherein n=0.5-3.0, and other metal hydroxides, said iron hydroxide being prepared by dissolving metals from iron comprising starting materials by means of mineral acids at pH 0.5-2.5, isolating undissolved solids from the dissolved metal salts and re-precipitating the iron as hydroxide at pH 3.5-4.5.

2. The process according to claim 1, wherein said iron comprising starting material is selected from the group consisting of mud dug out from rivers and harbors, soil, sewage sludge, fly dust, filter dust and residues from combustion and pyrolysis and scrap.

3. The process according to claim 1, wherein the other metal hydroxide is silicon hydroxide.

4. The process according to claim 1, wherein said precipitating agent comprises a combination of said iron hydroxide and at least one member selected from the group consisting of calcium, magnesium, aluminum and silicon hydroxide, and the amount of iron constitutes more than 50% of the total content of metal.

5. The process according to claim 1, wherein the iron hydroxide is combined with protecting colloids.

6. The process according to claim 5, wherein the iron hydroxide used is essentially free from other metal hydroxides.

7. The process according to claim 1, wherein said dissolved metal salts are treated with an oxidizing agent prior to said re-precipitation.

8. The process according to claim 2, wherein said dissolved metal salts are treated with an oxidizing agent prior to said re-precipitation.

9. The process according to claim 1, wherein said dissolved metal salts are treated with an oxidizing agent prior to said re-precipitation.

10. The process according to claim 5, wherein said dissolved metal salts are treated with an oxidizing agent prior to said re-precipitation.

11. A method for the precipitation of phosphates from municipal and industrial waters and other phosphate comprising water, which comprises using as a precipitating agent an iron hydroxide of the formula $$Fe_2O_3 \cdot nH_2O$$

wherein n=0.5–3.0, and other metal hydroxides, said iron hydroxide being prepared by dissolving metals from iron comprising starting material by means of mineral acids at pH 0.5–2.5, isolating undissolved solids from the dissolved metal salts and re-precipitating the iron as hydroxide at pH 3.5–4.5.

12. A method according to claim 11, wherein said iron comprising starting material is selected from the group consisting of mud dug out from rivers and harbors, soil, sewage sludge, fly dust, filter dust and residues from combustion and pyrolysis and scrap.

13. A method according to claim 11, wherein the other metal hydroxide is silicon hydroxide.

14. A method according to claim 11, wherein said precipitation agent comprises a combination of said iron hydroxide and at least one member selected from the group consisting of calcium, magnesium, aluminum and silicon hydroxide, and the amount of iron constitutes more than 50% of the total content of metal.

15. A method according to claim 11, wherein the iron hydroxide is combined with protecting colloids.

16. A method according to claim 15, wherein the iron hydroxide used is essentially free from other metal hydroxides.

17. The method according to claim 11, wherein said dissolved metal salts are treated with an oxidizing agent prior to said precipitation.

18. The method according to claim 11, wherein said dissolved metal salts are treated with an oxidizing agent prior to said precipitation.

* * * * *